(12) United States Patent
Olden et al.

(10) Patent No.: US 12,278,839 B2
(45) Date of Patent: Apr. 15, 2025

(54) SYSTEMS, METHODS, AND STORAGE MEDIA FOR ASSESSMENT AND DISCOVERY OF IDENTITY RESOURCES IN AN IDENTITY INFRASTRUCTURE

(71) Applicant: Strata Identity, Inc., Niwot, CO (US)

(72) Inventors: Eric Olden, Niwot, CO (US); Christopher Marie, San Juan, PR (US); Carl Eric Leach, Piedmont, CA (US)

(73) Assignee: Strata Identity, Inc., Niwot, CO (US)

( * ) Notice: Subject to any disclaimer, the term of this patent is extended or adjusted under 35 U.S.C. 154(b) by 185 days.

(21) Appl. No.: 17/317,156

(22) Filed: May 11, 2021

(65) Prior Publication Data
US 2021/0360034 A1 Nov. 18, 2021

Related U.S. Application Data

(60) Provisional application No. 63/023,657, filed on May 12, 2020.

(51) Int. Cl.
*H04L 29/00* (2006.01)
*H04L 9/40* (2022.01)

(52) U.S. Cl.
CPC ............ *H04L 63/20* (2013.01); *H04L 63/306* (2013.01)

(58) Field of Classification Search
CPC .............................. H04L 63/20; H04L 63/306
USPC ............................................................ 726/1
See application file for complete search history.

(56) References Cited

U.S. PATENT DOCUMENTS 8,418,238 B2 * 4/2013 Platt ........................ H04L 63/20
 726/8
9,860,154 B2 * 1/2018 Balabine ................. G06F 21/55

* cited by examiner

*Primary Examiner* — Brandon Hoffman
*Assistant Examiner* — Michael D Anderson
(74) *Attorney, Agent, or Firm* — Berg Hill Greenleaf Ruscitti LLP

(57) ABSTRACT

Systems, methods, and storage media for assessment of identity resources in an identity infrastructure are disclosed. Exemplary implementations may: assess the identity infrastructure with at least one discovery agent element; identify, by the at least one discovery agent element, one or more infrastructure elements within the identity infrastructure; intercept, by the at least one discovery agent element, first network traffic in the identity infrastructure; assess, by the at least one discovery agent element, at least one of a status and a structure of the identity infrastructure; and report, by the at least one discovery agent element, at least one of the status and the structure of the identity infrastructure to one or more of an administrator and a centralized server.

18 Claims, 7 Drawing Sheets

SYSTEMS, METHODS, AND STORAGE MEDIA FOR ASSESSMENT AND DISCOVERY OF IDENTITY RESOURCES IN AN IDENTITY INFRASTRUCTURE

CLAIM OF PRIORITY UNDER 35 U.S.C. § 119

The present application for patent claims priority to U.S. Provisional Application No. 63/023,657 filed May 12, 2020, and assigned to the assignee hereof, which is hereby expressly incorporated by reference herein.

FIELD OF THE DISCLOSURE

The present disclosure relates to systems, methods, and storage media for discovery and assessment of identity resources related to user identity in an identity infrastructure.

BACKGROUND

An identity management system refers to computing platforms implementing a set of technologies used for controlling individual identities, their authentication, authorization, roles and privileges within or across the system and any enterprise boundaries associated with the system. These identity management systems are utilized to increase security within the system and enterprise boundaries, thereby increasing productivity, while decreasing cost, downtime, and repetitive tasks.

Types of functions provided by an identity management system include digital file access control, password management, provisioning of services within the network; enabling single sign-on (SSO), managing security tokens; and mitigating risk, among others. To provide these features, identity management systems frequently use identifiers comprising data used to identify a subject, credentials comprising evidence to support for claims about identities or parts thereof, and attributes comprising characteristics of a subject.

Since many entities utilize multiple third-party providers of cloud services, each with its own identity management system, there is increased fragmentation, layering, and dispersion of identity management within single organizations that utilize multiple services. This fragmentation, layering, and dispersion of identity management can create a cumbersome system to effectively administer.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below. For the purposes of this disclosure, the term "authentication" may refer to the process of verifying who a user is (i.e., to confirm that users are who they say they are), while the term "authorization" may refer to the process of verifying what a user has access to (e.g., access to a resource, such as an app, a document, a database, etc.).

Generally, the present discovery relates to a system configured for discovery and assessment of identity infrastructure. In some cases, discovery agents are placed within the identity infrastructure which are able to detect and assess information relevant to the overall status and structure of the identity infrastructure and report said data to administrators in human and machine-readable forms. In some examples, the discovery agents may be configured to act autonomously (e.g., with minimal input from a centralized server or administrator). Examples of relevant identity infrastructure data include components of the identity infrastructure such as, but not limited to, identity domains, protected resources, and policy enforcement points. Examples further include identity data (e.g., individual user's data, including their credentials and attributes) and identity metadata (e.g., information about how identity is managed and coordinated, including password rules, authorization policies, network location of elements of an identity domain, etc.). Examples further include behaviors of the system. Examples further include network topologies. Examples further include dependencies between an identity system and a protected resource, such as a software application.

One aspect of the present disclosure relates to a system configured for assessment of identity resources in an identity infrastructure. The system may include one or more hardware processors configured by machine-readable instructions. The processor(s) may be configured to assess the identity infrastructure with at least one discovery agent element. The identity infrastructure may include one or more identity domains and one or more identity infrastructure elements. The at least one discovery agent element may be installed on or adjacent to at least one of the one or more identity infrastructure elements. The one or more identity domains may include one or more identity domain elements. The processor(s) may be configured to identify, by the at least one discovery agent element, one or more infrastructure elements within the identity infrastructure. The processor(s) may be configured to intercept, by the at least one discovery agent element, first network traffic in the identity infrastructure. The first network traffic may include one or more of requests for identity data and identity metadata from the one or more infrastructure elements within the identity infrastructure. The identity data may include one or more of a user identity, a user credential, and a user attribute for one or more users of the one or more identity domains. The identity metadata may include but is not limited to one or more of; the enumeration of identity infrastructure elements and their network location and their configuration, identity policy such as authorization or authentication rules and mechanisms, and identity session structure and content. The processor(s) may be configured to assess, by the at least one discovery agent element, at least one of a status and a structure of the identity infrastructure. The assessing may be based at least in part on the identifying, the intercepting, or a combination thereof. The processor(s) may be configured to report, by the at least one discovery agent element, at least one of the status and the structure of the identity infrastructure to one or more of an administrator and a centralized server. The reporting may be based at least in part on the assessing.

Another aspect of the present disclosure relates to a method for assessment of identity resources in an identity infrastructure. The method may include assessing the identity infrastructure with at least one discovery agent element. The identity infrastructure may include one or more identity domains and one or more identity infrastructure elements. The at least one discovery agent element may be installed on or adjacent to at least one of the one or more identity infrastructure elements. The one or more identity domains may include one or more identity domain elements. The method may include identifying, by the at least one discovery agent element, one or more infrastructure elements within the identity infrastructure. The method may include intercepting, by the at least one discovery agent element, first network traffic in the identity infrastructure. The first network traffic may include one or more of requests for identity data and identity metadata from the one or more infrastructure elements within the identity infrastructure. The identity data may include one or more of a user identity, a user credential, and a user attribute for one or more users of the one or more identity domains. The identity metadata may include, but is not limited to, one or more of: the enumeration of identity infrastructure elements and their network location and their configuration, identity policy such as authorization or authentication rules and mechanisms, and identity session structure and content. The method may include assessing, by the at least one discovery agent element, at least one of a status and a structure of the identity infrastructure. The assessing may be based at least in part on the identifying, the intercepting, or a combination thereof. The method may include reporting, by the at least one discovery agent element, at least one of the status and the structure of the identity infrastructure to one or more of an administrator and a centralized server. The reporting may be based at least in part on the assessing.

Yet another aspect of the present disclosure relates to a non-transient computer-readable storage medium having instructions embodied thereon, the instructions being executable by one or more processors to perform a method for assessment of identity resources in an identity infrastructure. The method may include assessing the identity infrastructure with at least one discovery agent element. The identity infrastructure may include one or more identity domains and one or more identity infrastructure elements. The at least one discovery agent element may be installed on or adjacent to at least one of the one or more identity infrastructure elements. The one or more identity domains may include one or more identity domain elements. The method may include identifying, by the at least one discovery agent element, one or more infrastructure elements within the identity infrastructure. The method may include intercepting, by the at least one discovery agent element, first network traffic in the identity infrastructure. The first network traffic may include one or more of requests for identity data and identity metadata from the one or more infrastructure elements within the identity infrastructure. The identity data may include one or more of a user identity, a user credential, and a user attribute for one or more users of the one or more identity domains. The identity metadata may include but is not limited to one or more of; the enumeration of identity infrastructure elements and their network location and their configuration, identity policy such as authorization or authentication rules and mechanisms, and identity session structure and content The method may include assessing, by the at least one discovery agent element, at least one of a status and a structure of the identity infrastructure. The assessing may be based at least in part on the identifying, the intercepting, or a combination thereof. The method may include reporting, by the at least one discovery agent element, at least one of the status and the structure of the identity infrastructure to one or more of an administrator and a centralized server. The reporting may be based at least in part on the assessing.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
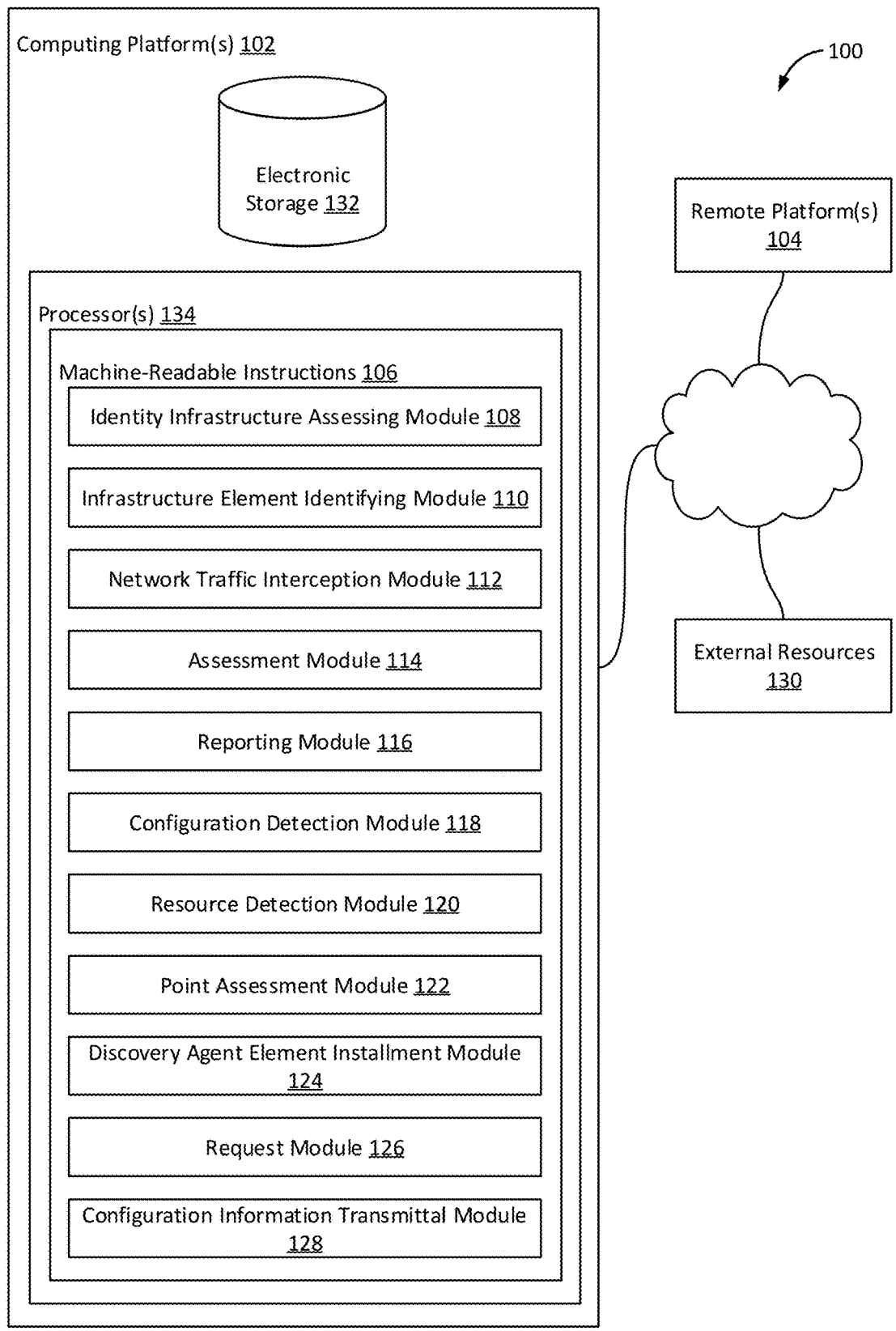
FIG. 1 illustrates a system configured for assessment of identity resources in an identity infrastructure, in accordance with one or more implementations.

Identity Data refers to an individual users' data, including their credentials and attributes. An Identity Session, also referred to herein as a session, refers to an established set of Identity Data that represents a user interacting with the Identity Infrastructure. Typically, a session is established by authenticating a user, for instance, by the user proving their identity through a mechanism such as password or biometrics, and maintaining this session state (e.g., an authenticated state) for some established period of time or until the user logs out or their access rights are otherwise suspended. In some cases, a session may refer to a logical construct which may be represented by a digital token such as, but not limited to, a cookie, access token or SAML assertion, that establishes persistence across file access and/or page views (e.g., HTTP pages). For example, HTTP is a stateless protocol, which means that when a user requests a particular webpage or resource from a server, and subsequently requests another webpage or resource from the same server, the server treats the user as a new "requestor" each time. In some examples, a session state refers to a mechanism that allows the server to remember the user by keeping a temporary record of the user. In some cases, each session may be assigned a unique identifier (or session ID) and this session ID may be used to store and retrieve a session state (or an application's working set of data) before and after each page view (e.g., HTTP page view). In one embodiment, session IDs may comprise a cookie stored in a user's browser, held in memory in one or more components of an identity system, or stored persistently in a data store such as a file system or database In some examples, identity metadata may refer to information about how identity is managed and coordinated. This may include password rules, authorization policies, and network location (e.g., HTTP address, URL, FTP address, network address, such as an IP address, a MAC address, to name a few non-limiting examples) of elements of an identity domain, etc. The identity system may use such network location, e.g. an https URL in an authentication or authorization policy, or an IP address to indicate where a component of an identity system is deployed. Authentication and Authorization policies may contain a reference to an application in the form of a hostname, URL, or IP address where the application is hosted. The identity domain configuration might require an agent (e.g. a policy enforcement point, authorization point, authorization system, access system, etc.) to be installed on or adjacent to the server where the application is deployed and reference the installed location of that agent on the network by computer hostname or IP address. A discovery agent may be deployed on the network such that it can inspect traffic between the agent and the access management server and between the agent and the application. In order to inspect that traffic, the discovery agent would require some knowledge of the network routes open between these elements and have some means of proxying requests between them. In many cases, each identity domain element must have a configuration that determines how to address other identity domain elements, and in some cases how to securely communicate with those other elements.

An identity domain refers to a computing system for managing one or more of users and roles, integration standards, external identities, and secure application integration using, for instance, an authentication scheme (e.g., Single Sign-On (SSO)) and/or an authorization protocol (e.g., a set of rules that allows a third-party website or application to access a user's data without the user needing to share login credentials). In some examples, an identity domain controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain to share user definitions and authentication rules, for instance. In some cases, users associated with an identity domain may be granted different levels of access (or authorization) to each service (e.g., cloud service) associated with the identity domain. Thus, in some aspects, an Identity Domain is a self-contained realm with consistent identity data and identity metadata throughout. Some non-limiting examples of an identity domain include an Active Directory (AD) domain or an Okta account for a single company. A discovery agent may refer to an entity (e.g., autonomous or semi-autonomous software entity) that is capable of assessing identity information within an identity infrastructure. Examples of this information include identity data, identity metadata, contents of identity sessions, protected resources (e.g., applications or apps), and the configuration and deployment of software and hardware entities (e.g., identity domain elements) that make up an identity domain. For the purposes of this disclosure, a protected resource comprises an element or application of the identity infrastructure to which access and control is allowed or restricted based at least in part on identity data. An autonomous or semi-autonomous discovery agent may refer to the different actions the discovery agent undertakes, depending on the component within the identity domain the discovery agent is interacting with. For example, a discovery agent interacting with a web server may need to undertake different actions to understand the identity data associated with the web server as compared to the actions undertaken by a discovery agent deployed to interact with an identity data store. Understanding the collection of unique identity data or metadata utilized by each of these autonomously operating components (web server, data store) may be required to build a complete picture of the distributed components and data of an identity domain. At least one discovery agent is deployed at the beginning of the discovery process. The discovery agent may be installed on a server adjacent to the identity domain elements. As different elements of the identity domain are discovered, additional discovery agents may be installed on different servers adjacent to the different elements.

FIG. 1 illustrates a system 100 configured for discovery and assessment of identity resources in an identity infrastructure, in accordance with one or more implementations. For the purposes of this disclosure, the terms "identity resources" and "identity infrastructure elements" may be used interchangeably throughout the application. Further, identity resources (or identity infrastructure elements) may comprise identity domains, protected resources, policy enforcement points (e.g., shown as access system 423 in FIG. 4), identity data, identity metadata, policies (e.g., access policies, authentication policies, authorization policies, password policies, policies to determine the assignment of accounts to users, etc.), rules (e.g., password rules, rules controlling user administration tasks and the hierarchy delegation of those tasks, rules for assigning user memberships in groups and/or roles, rules to determine the assignment of accounts to users, authentication rules, etc.), and behaviors of the system. In one non-limiting example, access policies may comprise a list of roles and the resources, such as apps, with which the roles are provisioned. In some cases, an identity may belong to one or more roles (e.g., User A may belong to the Administrator and User roles, while User B may only belong to the User role). In some circumstances, organizations may limit access to resources based on roles, for instance, by specifying roles which a user must be a member of to access the requested resource. In this way, an organization may utilize roles to create and manage the records of a collection of users to whom the organization wants to permit access to a common functionality, such as access rights, permissions, etc. In another example, password rules may comprise one or more of a minimum password length (e.g., at least 8 characters long), required characters (e.g., password should include one Uppercase, one lowercase, and a special character), and any other applicable rules (e.g., password should not comprise user's birthdate or social security number (SSN), password should not be the same as a previously used password, to name two non-limiting examples). Other types of identity resources known in the art are contemplated, some of which are described in relation to FIGS. 3A, 3B, and 4.

In some implementations, system 100 (also shown as system 300-a in FIG. 3A) may include one or more servers 102. The system 300-a may comprise a centralized server, which may be similar or substantially similar to the server 102. Alternatively, the system 300-a may be implemented using a server, for instance, the system 300-a may be hosted on a server, such as server 102. In some cases, server 102 may be utilized to manage identity infrastructure and/or multiple distributed identity management environments. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. Some non-limiting examples of a client computing platform 104 may include a desktop computer, a laptop computer, a handheld computer, a tablet computing platform, a NetBook, a Smartphone, a gaming console, or any other applicable computing platform.

Server(s) 102 may be configured by machine-readable instructions 106. Machine-readable instructions 106 may include one or more instruction modules. One type of an instruction module may comprise a computer program. The instruction modules may include one or more of identity infrastructure assessing module 108, infrastructure element identifying module 110, network traffic interception module 112, assessment module 114, reporting module 116, configuration detection module 118, resource detection module 120, point assessment module 122, discovery agent element installment module 124, request module 126, configuration information transmittal module 128, and/or other instruction modules.

Identity infrastructure assessing module 108 (also referred to as an accessing module) may be configured to assess the identity infrastructure with at least one discovery agent element. For example, and as described herein, the discovery agents are collecting identity data and metadata from the elements in an identity infrastructure. Such data and metadata includes identity system configuration data and user identity attributes (both of which may be located in some predefined store and which doesn't change frequently), generated data such as log files (which is created as activity happens in the identity system), and real-time data such as a user making a request through his/her browser to an application (this real-time data travels over the network, changes frequently, and may be stored in ephemeral, in-memory data storage).

The identity infrastructure assessing module 108 may aggregate the data received from the discovery agents and therefore communicate with the discovery agents whenever a discovery agent has collected one of the sought-after types of data. In one such example, an administrator may start and run a discovery agent to connect to an identity system's API and provide the identity system's configuration data to the assessing module 108. This may happen infrequently, maybe only once at the beginning of the discovery process. In one such example, the discovery agent may collect log data on an ongoing basis. For example, the discovery agent may provide the assessing module all the log data from a server 'A' from the past week. In another example, the discovery agent may continuously run, collect, and send data to the assessing module as it travels over the network. The discovery agent software is developed to interact with the specific APIs of identity systems, particularly when those APIs are unique and proprietary to that identity system. Other elements of the identity system, for example LDAP directories and databases, use standard protocols that allow for reuse across a number of different elements of a similar type (e.g. databases from different vendors).

Figure 3A:
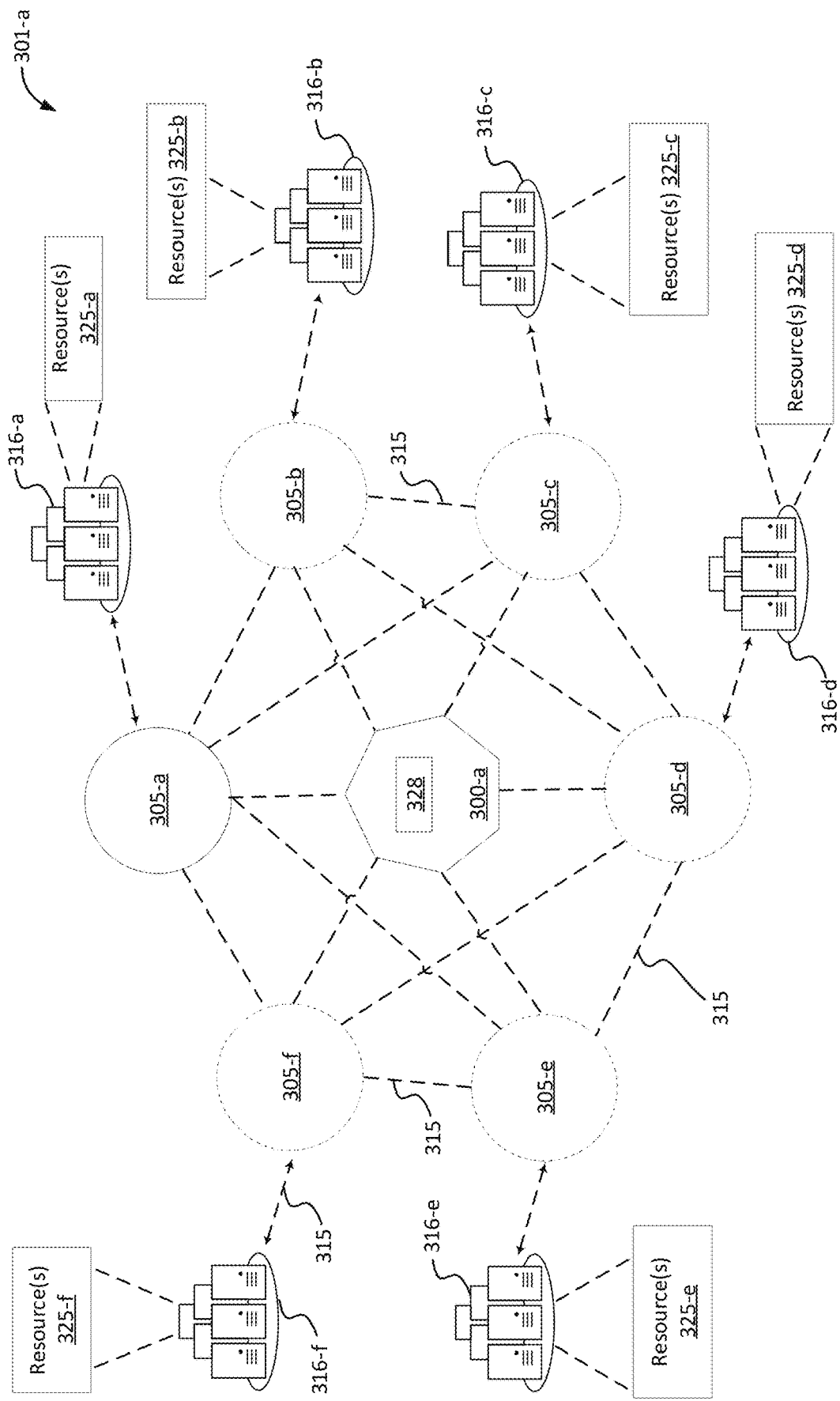
FIG. 3A illustrates a distributed identity management environment comprising the system of FIG. 1, according to an embodiment of the disclosure.
Figure 3B:
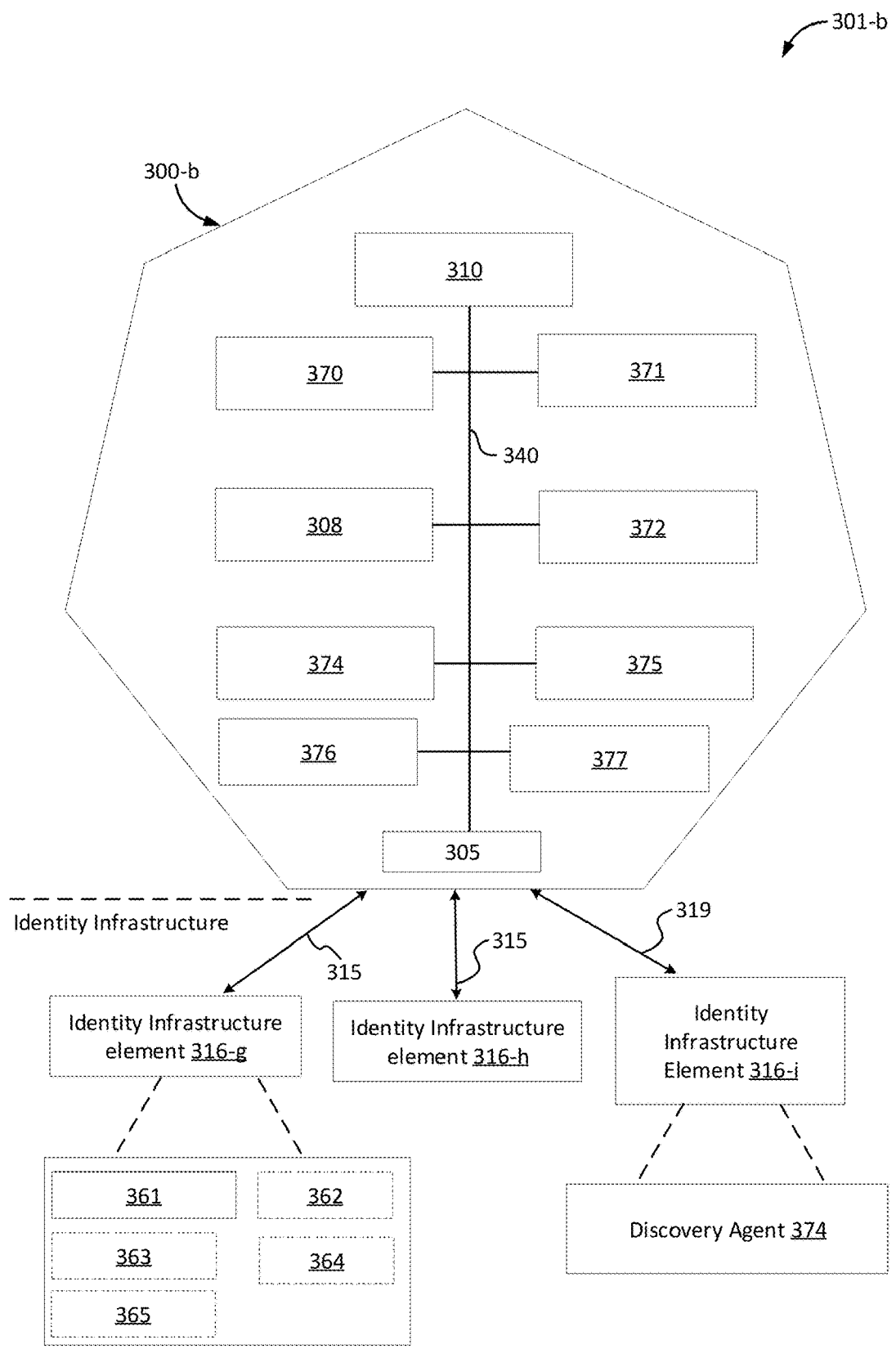
FIG. 3B illustrates a detailed view of the system in FIG. 3A showing an example location for a discovery agent, according to an embodiment of the disclosure.

The discovery agent (e.g., shown as discovery agent 305 in FIG. 3A, discovery agent 374 in FIG. 3B) and assessing module 108 (e.g., shown as identity infrastructure assessing module 308 in FIG. 3B) may run on separate hosts devices. Data may be requested by the assessing module or may be proactively sent by the discovery agent to the assessing module over standard network protocols (HTTPs, FTP, SSH, SCP, etc.).

Identity infrastructure assessing module 108 may be configured to assess, by the at least one discovery agent element, the identity infrastructure. The assessing may include one or more of detecting and reporting of identity data and identity metadata from within the identity infrastructure. The identity infrastructure may include one or more identity domains and one or more identity infrastructure elements. The one or more identity domains may further comprise one or more identity domain elements, where the one or more identity domain elements may comprise hardware (e.g., servers, computing devices or platforms, etc.), software (e.g., a cloud service), or a combination thereof. It is contemplated, and as described herein, the term "identity infrastructure" may include more than one identity domain. Each identity domain may identify domain elements which include the components that make up the identity domain. The components of the identity domain may include the identity data or metadata that may be discovered. However, it is contemplated that an identity domain may not be subordinate to an identity infrastructure. The at least one discovery agent element (e.g., shown as discovery agent 305-a in FIG. 3A) may be installed on or adjacent to at least one of the one or more identity infrastructure elements (e.g., shown as identity infrastructure element 316-a in FIG. 3A). By way of non-limiting example, the identity data may include one or more of a user identity (e.g., first and/or last name of user), a user credential (e.g., user name, password, password authentication token, etc., that are bound to the user), and a user attribute (e.g., email address, phone number, residential address, job title, department, employee ID, etc.) for one or more individual users of the one or more identity domains. By way of non-limiting example, the identity metadata may include one or more of a password rule, an authorization policy, an authentication policy, a trust policy, and network locations (e.g., HTTP address, URL, FTP address, network address, such as an IP address, a MAC address, to name a few non-limiting examples) for identity domain elements of the one or more identity domains. By way of non-limiting example, the one or more infrastructure elements installed in the identity infrastructure may include one or more of servers, routers, identity stores comprising one or more databases of authentication information, policy enforcement points for enforcing authorization rules (e.g., shown as access system 423 in FIG. 4), authentication points for determining user identity (e.g., shown as authenticate system 421 in FIG. 4), proxy devices, policy decision points for evaluating authorization rules based at least in part on identity session attributes, and protected resources (e.g., applications or apps). In some examples, a policy decision point (PDP) is a system entity or component of a policy-based access control system configured to make authorization decisions for itself or alternatively, for other system entities that request such decisions. For instance, a PDP may be configured to determine whether or not to authorize a user's request based on available information (e.g., attributes, such as identity session attributes) and/or applicable security policies. In some cases, a PDP may examine a request to access a resource and compare said request to the policy that applies to requests for accessing that resource (i.e., to determine whether the requestor, such as a user, should be granted access).

Infrastructure element identifying module 110 may be configured to identify, by the at least one discovery agent element, one or more infrastructure elements within the identity infrastructure.

In some examples, network traffic and identity traffic may pass through the identity infrastructure. Network traffic interception module 112 may be configured to intercept, by the at least one discovery agent element, first network traffic in the identity infrastructure. The first network traffic may include one or more requests for identity data and identity metadata from the one or more infrastructure elements within the identity infrastructure. For example, a user may request a resource (e.g. a protected resource, such as protected resource 525 in FIG. 5) within the identity infrastructure. Such a request may be intercepted by a web agent element (e.g., a web server hosting a SiteMinder WebAgent) that checks with an identity domain policy server to see whether the resource is protected with a policy, whether the user already has a session to access the resource (if yes whether the user is authorized, if no whether and how the user needs to be authenticated). One non-limiting example of an identity domain policy server may include the access system 423 and/or the authorization system 523 described in relation to FIGS. 4 and 5, respectively. A remote element, such as the authorization element, might request some policy information so that it can make access control decisions independently. By way of non-limiting example, the identity data may include one or more of a user identity, a user credential, and a user attribute for one or more users of the one or more identity domains. By way of non-limiting example, the identity metadata may include, but is not limited to, one or more of: the enumeration of identity infrastructure elements and their network location and configuration, identity policies such as authorization or authentication rules and mechanisms, and structure and contents of identity sessions. In some cases, the one or more of the identity data and the identity metadata may include one or more of data and metadata stored within the one or more infrastructure elements. In some examples, the discovery agent element may be configured to intercept and/or proxy networking traffic that represents assertions of identity data or identity metadata to protected resources by one or more other elements within the identity infrastructure. For example, and as previously discussed, the discovery agent may be deployed to watch that network traffic and/or read log data from the various points where these interactions are logged (e.g. web servers, identity data stores, policy server logs, etc.). The discovery agent element may be configured to assess and report on the structure of the identity infrastructure based on such interceptions.

Assessment module 114 may be configured to assess, by the at least one discovery agent element, at least one of a status and a structure of the identity infrastructure. For example, after collecting data from the one or more discovery agents, the assessment module may determine which types of access had been granted on a resource, for which users, as the result of the evaluation of certain policies, and in conjunction with authentication by a particular identity domain. This evaluation may represent the "status" of the identity infrastructure. By way of non-limiting example, the assessing may be based at least in part on the identifying, the intercepting, or a combination thereof.

Reporting module 116 may be configured to report, by the at least one discovery agent element, at least one of the status and the structure of the identity infrastructure to one or more of an administrator and a centralized server (e.g., shown as system 300-*a* in FIG. 3A). In some examples, the reporting may be based at least in part on the assessing.

Configuration detection module 118 may be configured to detect and assess one or more configurations of the one or more infrastructure elements installed in the identity infrastructure based at least in part on the identifying. By way of non-limiting example, the one or more configurations may include at least one of the identity data and metadata that may be stored within the identity infrastructure elements, information related to a flow of data associated with the one or more infrastructure elements, and behavior of the one or more identity infrastructure elements. As an example, if a user is attempting to access a protected resource, a request may be sent to a corresponding identity infrastructure element. If the request arrives without an identity session, the user may be redirected to a login page for a corresponding identity domain, where the user is prompted for login credentials. After the identity session is established, the user may be redirected to the protected resource. In this example, the discovery agent element may be configured to detect and assess the network and/or identity traffic as it is routed to the protected resource, for instance, to identify the type of information a successful request contains, to identify how and where unsuccessful requests are routed, etc. A successful request may refer to a request where a user gains access to the protected resource. Contrastingly, an unsuccessful request may refer to a request where the user is denied access to the protected resource. Further, as noted above, an identity session refers to an established set of identity data that represents a user interacting with the identity infrastructure. In some cases, a session may be established by authenticating a user (e.g., by a user proving their identity through a mechanism such as password or biometrics) and maintaining this session state (e.g., authenticated state) for some established period of time or until the user logs out or their access rights are otherwise suspended.

Resource detection module 120 may be configured to detect and assess protected resources, such as apps, within the identity infrastructure based at least in part on processing the one or more configurations of the one or more identity infrastructure elements. In some cases, the detection may be based in part on processing the network traffic and identity traffic as it passes through the identity infrastructure. Additionally or alternatively, the detection may be based in part on processing identity session information, where the identity session information may include identity data for the one or more users. In some cases, identity session information may refer to the information (e.g., username/password, biometrics, multi-factor authentication information, etc.) used to establish an identity session.

Point assessment module 122 may be configured to assess one or more additional points of interest (e.g., network locations) within the identity infrastructure. For instance, point assessment module 122 may be configured to detect and monitor, by a discovery agent element, at least one event linked to one or more data flows in the identity infrastructure. In some cases, the one or more data flows may pertain to identity data or identity metadata received at the identity infrastructure. As an example, a discovery agent element installed on or near a server, such as an access management server (e.g., an ORACLE ACCESS MANAGER (OAM) Server provided by Oracle Corporation of Austin, TX), may determine that there is a proxy point (e.g., WebAgent, such as a SiteMinder WebAgent) defined within the identity infrastructure. There is more than one way for the discovery agent to make this determination. One such way is that the proxy point/web agent may have its configuration stored on the server where it is deployed and the discovery agent may read that configuration file to determine that the proxy point is deployed.

However, a proxy/web agent configuration may also, or alternatively, be registered with the access management server, which may result in some configuration or policy metadata being stored by the access management server on its local server. The discovery agent could also obtain and report that configuration and policy data.

The discovery agent may further monitor how the proxy/web agent communicates with other identity domain elements and determine that discovery agents may be deployed to other parts of identity infrastructure to obtain similar configuration data about those other elements. The discovery agent element may determine that additional information about the identity infrastructure may be gleaned by adding a new discovery agent element on or near that proxy point. In such cases, one or more new discovery agent elements may be installed within the identity infrastructure, further described below.

Discovery agent element installment module 124 may be configured to install one or more new discovery agent elements within the identity infrastructure based at least in part on the assessing the one or more additional points of interest. The one or more new discovery agent elements may be installed autonomously or upon transmitting an installation request to the administrator or a centralized server. Returning to the example above, after a discovery agent element determines that additional information about the identity infrastructure may be gathered by installing a new discovery agent element, the discovery agent element installment module 124 may spawn or install a new discovery agent element at or near the proxy point.

Request module 126 may be configured to request, by a first discovery agent element, at least one of configuration information and networking information from a second discovery agent element. The requesting may include one of a direct request to the second discovery agent element and a request via a third discovery agent element. In some instances, the identity infrastructure information may be accessible by the second discovery agent element.

Configuration information transmittal module 128 may be configured to transmit, by the second discovery agent element, the identity infrastructure information to the first discovery agent element. The transmitting may include one of directly transmitting the identity infrastructure information to the first discovery agent element and transmitting the identity infrastructure information via the third discovery agent element. The third discovery agent element may be in communication with the first and the second discovery agent elements. Returning to the example above, after the new discovery agent element is installed at or near the proxy point (e.g., WebAgent) by the discovery agent installment module 124, the new discovery agent element or the configuration information transmittal module 128 may transmit identity infrastructure information to the first discovery agent element directly, or via a third discovery agent element.

In some implementations, access to and control of protected resources is allowed or restricted based at least in part on identity data contained within the identity session. In some implementations, the intercepting may further include intercepting or proxying, by the at least one discovery agent element, second network traffic in the identity infrastructure. In some implementations, the second network traffic may be associated with an assertion of identity data or identity metadata from the one or more identity infrastructure elements to a protected resource in the identity infrastructure. As compared to the first network traffic, where the system is checking what actions it should perform in response to the user's request for the resource, with the second network traffic, the identity domain is acting on the information received in the first network traffic by challenging the user for credentials, creating and sending session tokens, adding identity attributes to session tokens, cookies, or headers, etc. As with the first network traffic, during the second network traffic, the discovery agent can further detect where/how/when different identity data is flowing across the system.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 108, 110, 112, 114, 116, 118, 120, 122, 124, 126, and/or 128, and/or other modules. Processor(s) 134 may be configured to execute modules 108, 110, 112, 114, 116, 118, 120, 122, 124, 126, and/or 128, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, and/or 128 are illustrated in FIG. 1 as being implemented within a single processing unit, in implementations in which processor(s) 134 includes multiple processing units, one or more of modules 108, 110, 112, 114, 116, 118, 120, 122, 124, 126, and/or 128 may be implemented remotely from the other modules. The description of the functionality provided by the different modules 108, 110, 112, 114, 116, 118, 120, 122, 124, 126, and/or 128 described below is for illustrative purposes, and is not intended to be limiting, as any of modules 108, 110, 112, 114, 116, 118, 120, 122, 124, 126, and/or 128 may provide more or less functionality than is described. For example, one or more of modules 108, 110, 112, 114, 116, 118, 120, 122, 124, 126, and/or 128 may be eliminated, and some or all of its functionality may be provided by other ones of modules 108, 110, 112, 114, 116, 118, 120, 122, 124, 126, and/or 128. As another example, processor(s) 134 may be configured to execute one or more additional modules that may perform some or all of the functionality attributed below to one of modules 108, 110, 112, 114, 116, 118, 120, 122, 124, 126, and/or 128.

Figure 2:
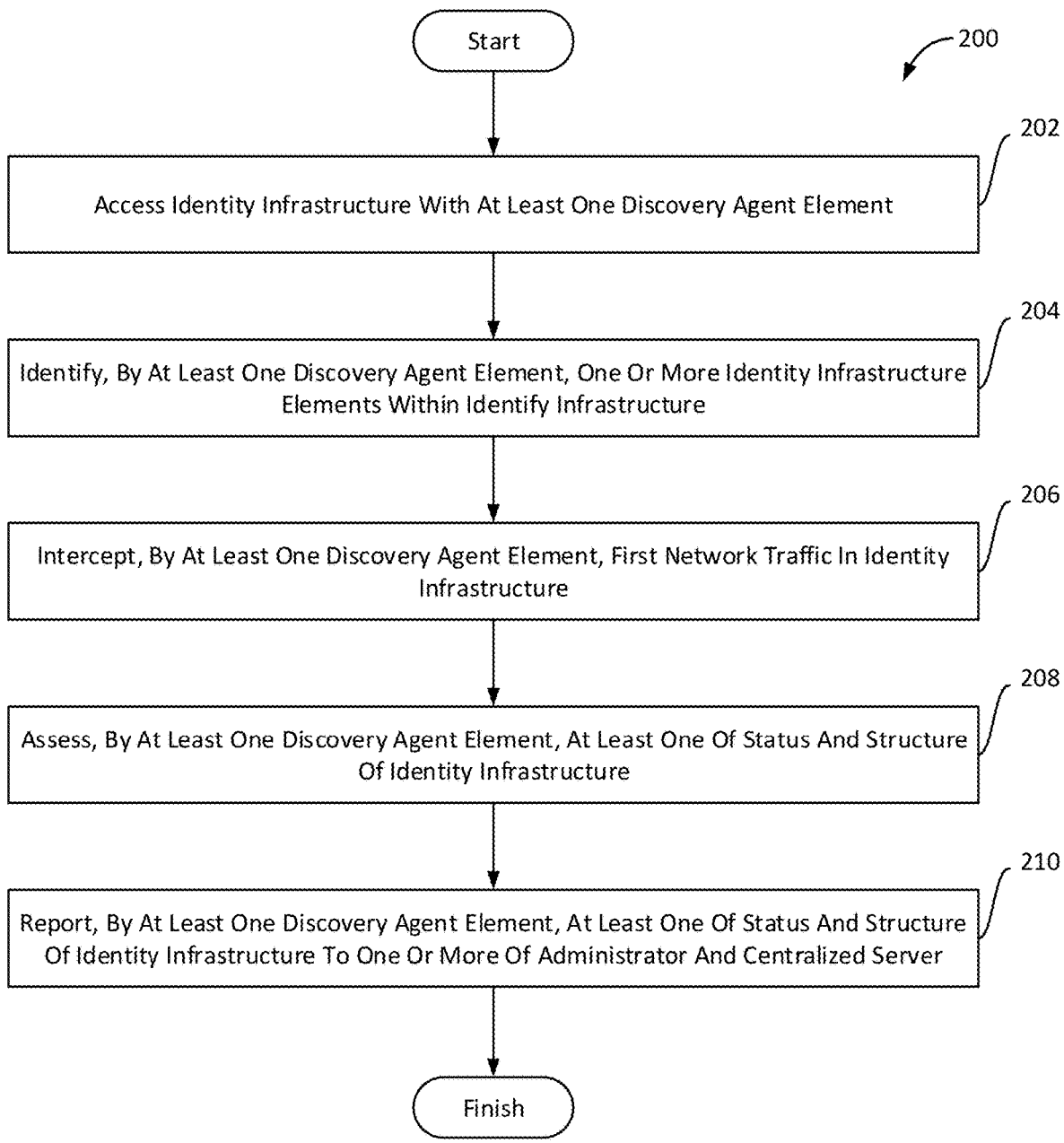
FIG. 2 illustrates a method for assessment of identity resources in an identity infrastructure, in accordance with one or more implementations.

FIG. 2 illustrates a method 200 for assessment of identity resources in an identity infrastructure, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

A first operation 202 may include assessing the identity infrastructure with at least one discovery agent element. The identity infrastructure may include one or more identity domains and one or more identity infrastructure elements. The at least one discovery agent element may be installed on or adjacent to at least one of the one or more identity infrastructure elements, such as an Apache server or a NGINX server. The one or more identity domains may include one or more identity domain elements. In some examples, the one or more identity domain elements may be embodied in hardware (e.g., servers, computing devices or platforms, etc.), software (e.g., a cloud service, an API, etc.), or a combination thereof. First operation 202 may be performed by one or more hardware processors configured by machine-readable instructions including a module that is the same as or similar to identity infrastructure assessing module 108, in accordance with one or more implementations.

A second operation 204 may include identifying, by the at least one discovery agent element, one or more identity infrastructure elements within the identity infrastructure. As described above, some non-limiting examples of identity infrastructure elements (also referred to as identity resources) may include servers, routers, identity stores comprising one or more databases of authentication information, policy enforcement points for enforcing authorization rules (e.g., shown as access system 423 in FIG. 4), authentication points for determining user identity (e.g., shown as authenticate system 421 in FIG. 4), proxy devices, policy decision points for evaluating authorization rules based at least in part on identity session attributes, and protected resources (e.g., applications or apps, such as apps 425 in FIG. 4). Second operation 204 may be performed by one or more hardware processors configured by machine-readable instructions including a module that is the same as or similar to infrastructure element identifying module 110, in accordance with one or more implementations.

A third operation 206 may include intercepting, by the at least one discovery agent element, first network traffic in the identity infrastructure. The first network traffic may include one or more of requests for identity data and identity metadata from the one or more infrastructure elements within the identity infrastructure. The identity data may include one or more of a user identity, a user credential, and a user attribute for one or more users of the one or more identity domains. The identity metadata may include, but is not limited to, one or more of the enumeration of identity infrastructure elements and their network location and configuration, identity policies such as authorization or authentication rules and mechanisms, and identity session structure and content. Identity sessions may comprise, for example, timestamps for when a session was initiated, the maximum lifetime of a session, how long a session should last for an idle user, an opaque user identifier, a reference to a session identifier (optional, if maintained centrally), a reference to the resource being requested, one or more claims about the user (sometimes identity attributes), one or more "scopes", and/or an enumeration of privileges the user has for the requested resource. Sessions may be maintained in browser cookies, Json Objects that are passed between different endpoints, server caches, or databases. Third operation 206 may be performed by one or more hardware processors configured by machine-readable instructions including a module that is the same as or similar to network traffic interception module 112, in accordance with one or more implementations.

A fourth operation 208 may include assessing, by the at least one discovery agent element, at least one of a status and a structure of the identity infrastructure. The assessing may be based at least in part on the identifying, the intercepting, or a combination thereof. Fourth operation 208 may be performed by one or more hardware processors configured by machine-readable instructions including a module that is the same as or similar to assessment module 114, in accordance with one or more implementations.

A fifth operation 210 may include reporting, by the at least one discovery agent element, at least one of the status and the structure of the identity infrastructure to one or more of an administrator and a centralized server. The reporting may be based at least in part on the assessing. Fifth operation 210 may be performed by one or more hardware processors configured by machine-readable instructions including a module that is the same as or similar to reporting module 116, in accordance with one or more implementations.

FIG. 3A illustrates identity infrastructure 301-a within a distributed identity management environment, according to an embodiment of the disclosure. In some cases, the identity infrastructure 301-a may comprise one or more identity infrastructure elements 316 and may be associated with one or more identity domains. For example, each of the one or more identity infrastructure elements 316 may be associated with one identity domain of the one or more identity domains. Alternatively, multiple identity infrastructure elements 316 may be associated with a single identity domain. In some examples, the identity infrastructure 301-a may be deployed by a single client organization or enterprise. In some cases, at least a portion of the identity infrastructure elements 316 may be associated with one or more cloud computing platforms. For instance, the client organization may utilize the cloud computing platforms for running applications ("apps") used by the client organization's workforce (e.g., a CRM app, such as SALESFORCE, an accounting app, project management app, an app or software used by their HR department, to name a few non-limiting examples) and/or the client organization's customers (e.g., a customer self-service portal used by customers of a wireless provider or Internet-cable company).

In some cases, the distributed identity management environment comprising identity infrastructure 301-a may comprise a system 300-a configured for administration and management of the one or more identity domains. System 300-a may be similar or substantially similar to the system 100 described in relation to FIG. 1. In some embodiments, the system 300-a may comprise a centralized server (not shown). Alternatively, the system 300-a may be implemented using a server (e.g., the system 300-a may be hosted on a server), where the server may be utilized to manage the identity infrastructure. In some other cases, the server or system 300-a may be configured to manage multiple distributed identity management environments, each distributed identity management environment associated with at least one enterprise or organization and comprising one or more identity infrastructure elements. For instance, the server (or system 300-a) may be located in the cloud (i.e., not exclusive to a single client) and may be configured to simultaneously discover and assess identity infrastructure elements across multiple distributed identity management environments via the cloud. Alternatively, the identity infrastructure and/or disparate identity domains (e.g., cloud-based, on-premises, etc.) for each client organization or enterprise may be assessed via an existing identity infrastructure element (e.g., identity infrastructure element 316-a, which may be an example of an on-premises Apache or Nginx server).

In some embodiments, protected resources (e.g., applications or apps) may be distributed across multiple cloud platforms. For instance, a company or organization may comprise first resources 325-a deployed on a first cloud platform, second resources 325-b deployed on a second cloud platform, third resources 325-c deployed on a third cloud platform, fourth resources 325-d deployed on a fourth cloud platform, fifth resources 325-e deployed on a fifth cloud platform 316-e, and sixth resources 325-f deployed on a sixth cloud platform. In some cases, each cloud platform may be associated with a unique identity infrastructure system and management system. For instance, each cloud platform may be associated with a unique set of identity infrastructure elements 316. In some circumstances each of the one or more identity infrastructure elements 316 may comprise varying configurations and/or behaviors. Some non-limiting examples of identity infrastructure elements 316 installed in the identity infrastructure include servers, routers, identity stores, policy enforcement points, authentication points, proxies or proxy devices, policy decision points, etc. In some examples, the identity policies comprise at least one of authorization rules and mechanisms and authentication rules and mechanisms. The identity data may be utilized to access and control the one or more protected resources.

In some cases, assessment of identity resources or identity infrastructure elements in an identity infrastructure may begin by the introduction of workers and/or proxies into the identity infrastructure. These workers and/or proxies may be configured to assist in the detection and assessment of the identity information, such as identity data and identity metadata, stored within these identity infrastructure elements. In some cases, one or more discovery agents 305 may be installed within the identity infrastructure 301-a. In some examples, the discovery agents 305 may be configured to report information about the identity infrastructure to another agent or module, for instance, the identity infrastructure assessing module 108 or the infrastructure element identifying module 110 previously described in relation to FIG. 1. Such information may comprise a list of identity infrastructure elements, network location (e.g., IP address) and/or configuration information for the various identity infrastructure elements 316, information pertaining to how the infrastructure elements communicate with each other and/or other devices in the architecture, information pertaining to the types of authentication and authorization mechanisms supported (or required) by the infrastructure elements 316, and what metadata the infrastructure elements 316 use, such as authentication or authorization policies, password policies, etc.

As shown, a first discovery agent element 305-a may be installed on or near an identity infrastructure element 316-a (e.g., an Apache or NGINX server). In some examples, the system 300-a may comprise at least one module 328, which may be an example of an identity infrastructure assessing module (e.g., identity infrastructure assessing module 108 in FIG. 1), an infrastructure element identifying module (e.g., infrastructure element identifying module 110 in FIG. 1), a network traffic interception module (e.g., network traffic interception module 112 in FIG. 1), etc. The system 300-*a* and the at least one module 328 may be configured to assess the identity infrastructure 301-*a* by the at least one discovery agent element 305-*a*. In some cases, additional discovery agent elements 305 (e.g., discovery agent element 305-*b*, 305-*c*, etc.) may be spawned. It should be noted that the dash-dot lines for the discovery agent elements 305-*b*, 305-*c*, 305-*d*, 305-*e*, and 305-*f* indicate that they are optional.

In some cases, assessing the identity infrastructure 301-*a* may comprise one or more of identifying the one or more infrastructure elements 316 within the identity infrastructure, intercepting network traffic in the identity infrastructure, assessing a status and structure of the identity infrastructure, detecting and assessing one or more configurations of the one or more infrastructure elements installed in the identity infrastructure, detecting and assessing protected resources, such as resources 325, within the identity infrastructure, and/or assessing one or more additional points of interest within the identity infrastructure. Assessing a status and structure of the identity infrastructure comprises identifying the configuration of the infrastructure elements, how they are communicating with each other, and the operational status of each component and the system as a whole. Such assessing may include determining whether a component is functioning appropriately and/or determining the volume of identity operations being performed by that component. As noted above, the one or more infrastructure elements 316 installed in the identity infrastructure may include one or more of: servers, routers, identity stores comprising one or more databases of authentication information, policy enforcement points for enforcing authorization rules, authentication points for determining user identity, proxy devices or proxies, policy decision points for evaluating authorization rules, and/or protected resources, to name a few non-limiting examples. In some cases, the discovery agent element 305-*a* may identify at least a portion of these identity infrastructure elements. For instance, in one non-limiting example, the discovery agent may identify that the infrastructure element 316-*a* comprises a server and an identity store, the infrastructure element 316-*b* comprises a policy enforcement point and a policy decision point, and the infrastructure element 316-*c* comprises an authentication point.

In some cases, each of the dashed lines may represent a data flow 315 (e.g., flow of network traffic). As used herein, the term "data flow" may refer to a path for data to move from different parts of the distributed identity management environment. For instance, data flow may refer to a path for data to move between different identity infrastructure elements 316, between different discovery agent elements 305, and/or between a discovery agent element 305 and the system 300-*a*, to name a few non-limiting examples. In some examples, a data flow may represent a single data element (e.g., username, date of birth, Social Security Number (SSN), etc.). Alternatively, a data flow may represent a set of data elements (i.e., a data structure). In some other cases, a data flow may be used to organize and persist self-service data (i.e., data may be transformed as part of the data flow). In some aspects, data flows may help reusability of the underlying data elements, for instance, between different identity infrastructure elements within the identity infrastructure.

In some cases, the one or more data flows 315 may pertain to identity data or identity metadata requests from the one or more infrastructure elements 316 within the identity infrastructure 301-*a*. In some cases, the at least one discovery agent element 305 (e.g., discovery agent element 305-*a*) may be configured to intercept first network traffic (e.g., a data flow 315) in the identity infrastructure, where the first network traffic may include one or more of requests for identity data (e.g., user identity, user credential, user attribute for one or more users of the one or more identity domains, etc.) and identity metadata (e.g., network location and configuration information of identity infrastructure elements, identity policies, structure and contents of identity sessions, etc.) from the one or more infrastructure elements 316. In some cases, the identity data and/or identity metadata may be stored within the one or more identity infrastructure elements. Returning to the example above, the discovery agent element 305-*a* may intercept network traffic, such as a request for identity data or identity metadata, between the infrastructure element 316-*c* (i.e., comprising an authentication point) and the infrastructure element 316-*a* (i.e., comprising a server and an identity store), for instance, for determining user identity.

FIG. 3B illustrates a detailed view of a system 300-*b* configured to detect and assess identity infrastructure 301-*b*, according to an embodiment of the disclosure. In some cases, the system 300-*b* may be similar or substantially similar to the system 300-*a* in FIG. 3A. Further, the identity infrastructure 301-*b* may be similar or substantially similar to the identity infrastructure 301-*a* described in relation to FIG. 3A. In some cases, the system 300-*b* may comprise one or more of: an identity infrastructure assessing module 308, an infrastructure element identifying module 310, a network traffic interception module 370, an assessment module 371, a configuration detection module 372, a resource detection module 373, a point assessment module 374, a discovery agent element installment module 375, a request module 376, and a configuration information transmittal module 377, which may be similar or substantially similar to the respective modules previously described in relation to FIG. 1 and elsewhere. In some cases, the various elements, agents, and/or modules of the system 300-*b* may be embodied in hardware, software, or a combination thereof. Further, the one or more agents and elements may be in communication via a bus 340.

In some cases, detection and assessment of identity infrastructure elements (e.g., identity infrastructure elements 316-*g*, 316-*h*, etc.) may begin by the introduction of workers and/or proxies into the identity infrastructure. In some cases, one or more discovery agents 374 may be installed within the identity infrastructure. For instance, the system 300-*b* may disperse one or more discovery agents 374 for installing in the identity infrastructure. The discovery agents may be configured to gather information about the architecture of the identity infrastructure and communications (e.g., data flows 315) between various users of the identity infrastructure and different apps or subsystems being accessed by said users, to name a few non-limiting examples. The discovery agents 374 may be further configured to report information about the identity infrastructure to any of the modules of the system 300-*b*, for instance, the identity infrastructure assessing module 308. Such information may comprise where the various identity infrastructure elements 316 are located in the network (e.g., IP addresses, etc.), how the identity systems 316 communicate with each other and/or other devices in the architecture, what types of authentication and authorization the systems 316 require, and what metadata the systems use, such as authentication or authorization policies, password policy, etc.

As shown, the identity infrastructure may comprise one or more identity infrastructure elements (e.g., identity infrastructure element 316-g, 316-h, 316-i), where each identity infrastructure element may be associated with or store information pertaining to one or more configurations 361. Optionally (shown by the dashed lines), at least a portion of the identity infrastructure elements 316 may store information pertaining to one or more groups 362, roles 363, features 364, and/or identities 365 related to the system's policies. Further, the one or more identity infrastructure elements may enforce one or more policies before users are allowed to gain access to applications (or protected resources) through the corresponding identity infrastructure element, or alternatively, another identity infrastructure element. In some aspects, the identity infrastructure elements may also serve as a gateway to the applications or protected resources.

In some cases, a discovery agent element installment module 375 may be configured to install 319 at least one discovery agent element (e.g., discovery agent 374) in the identity infrastructure. The identity infrastructure may include the one or more identity domains and identity infrastructure elements, and the at least one discovery agent 374 may be installed on or adjacent to an identity infrastructure element 316-i in the identity infrastructure. In some examples, the identity infrastructure element 316-i may be an Apache Server, an IIS Server, or any other piece of identity infrastructure located in the cloud and adapted to communicate and otherwise exchange data with other devices in the identity architecture 301-b via any identity protocol, for example OIDC, SAML, NTLM; or via any other software communication protocol such as HTTP, TCP, etc.

Next, the identity infrastructure assessing module 308 may be configured to assess, by the at least one discovery agent 374, the identity infrastructure. The assessing may include one or more of detecting and reporting, to the system 300-b, identity data and identity metadata from the identity infrastructure. For instance, the assessing may include detecting and reporting identity data (e.g., identities 365, roles 363, groups 362 related information) and identity metadata (e.g., information pertaining to configurations 361, features 364, policies, such as an authorization policy, network locations, etc.) from identity infrastructure elements 316-g and/or 316-h in the identity infrastructure. By way of a non-limiting example, the identity data may include one or more of a user identity, a user credential, and a user attribute for one or more individual users of the one or more identity domains. By way of non-limiting example, the identity metadata may include one or more of a password rule, an authorization policy, an authentication policy, a trust policy, and network locations for identity domain elements of the one or more identity domains.

In some embodiments, the discovery agents 374 may be used to assess and document the established identity infrastructure. The discovery agents 374 may be installed on or adjacent to an identity infrastructure element 316, e.g., on an Apache or Nginx server, or on the control elements of an established identity domain, such as an Oracle Access Manager (OAM) Server. The discovery agent 374 may be configured to detect and report identity data and identity metadata from the established identity infrastructure. Some non-limiting examples include user identities and attributes, configuration of the identity infrastructure and its flows, and authorization policies and rules. Such attributes may comprise name, address, and group associations. In some embodiments, the discovery agent 374 may be configured to detect and monitor at least one event associated with the one or more data flows 315, for instance, a request to access a protected resource. In some cases, the discovery agent may monitor network or identity traffic (e.g., as described above in relation to FIGS. 1 and 3A), identify the information used to establish an identity session (i.e., based on which access to the protected resource is granted), and convey the same to the system 300-b.

In some cases, the system 300-b may facilitate unified identity management across multiple identity systems and/or cloud platforms, which may not only allow consistent identities across clouds, but also policies, fundamentals of access control, and/or authentication. For instance, the system 300-b may enable an administrator for an organization to create unified policies, as well as consolidate rules (e.g., authentication rules, password rules, etc.), roles, groups, configurations, features, etc., across disparate identity systems. In this way, the system 300-b may allow the administrator to manage identities across the different identity systems in a unified manner, which may ease cross-platform compliance, auditing, and/or migration from on-premises systems to the cloud. By way of non-limiting example, managing the one or more data flows through the identity fabric may include managing the one or more data flows pertaining to identity data, where the identity data includes one or more of an authentication request, an authorization request, and an update of user attributes or credentials. In some cases, the discovery and assessment of the identity infrastructure as described herein, may be a precursor to such unified identity management.

Figure 4:
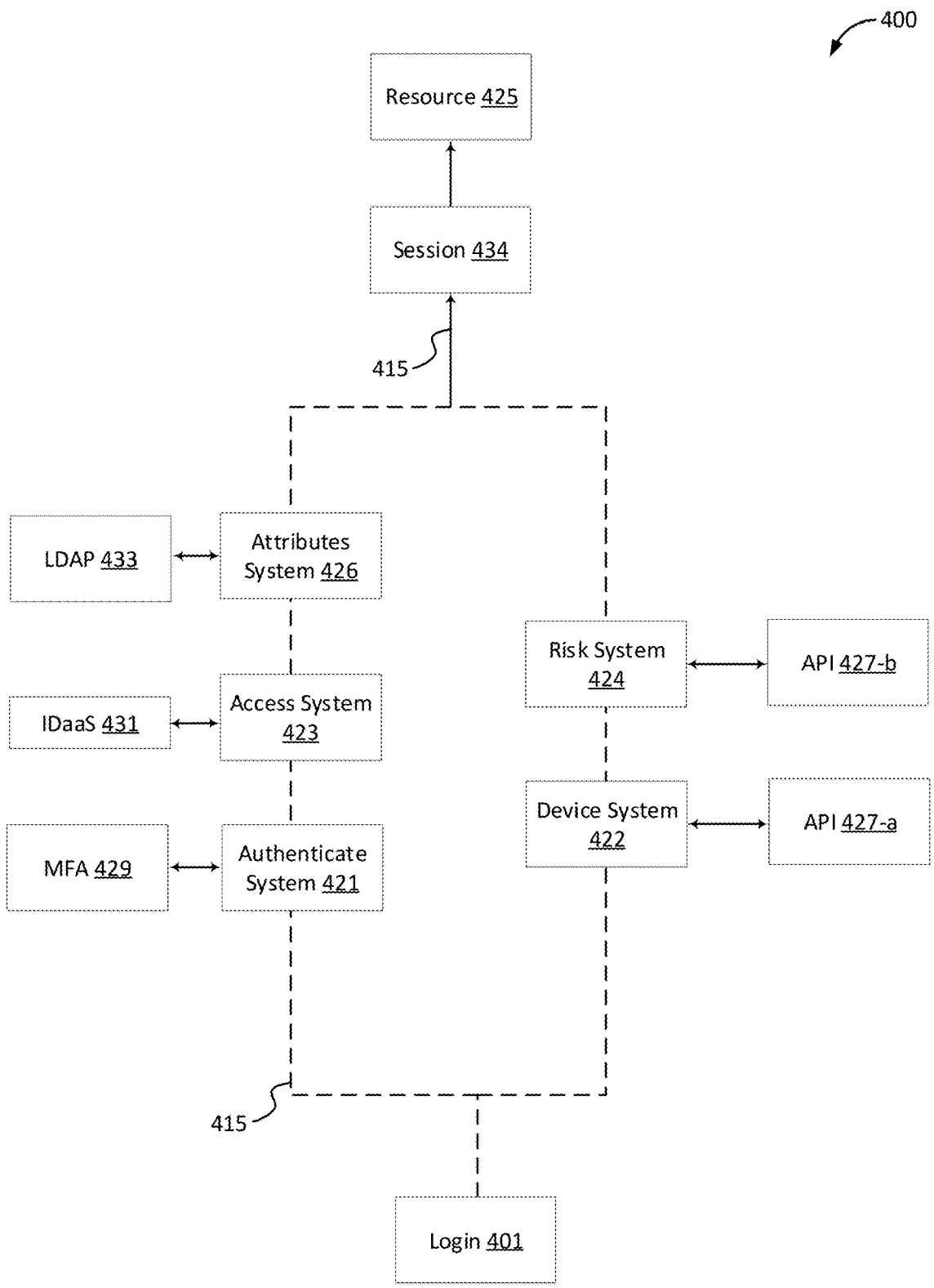
FIG. 4 illustrates a process flow for discovery and assessment of identity infrastructure elements within an identity infrastructure, according to an embodiment of the disclosure.

FIG. 4 illustrates a process flow 400 for discovery and assessment of identity infrastructure according to an embodiment of the disclosure. In some examples, the discovery and assessment may be performed by a discovery agent or any of the other modules described in relation to FIGS. 1 and/or 3B. In some cases, discovery and assessment of identity infrastructure may begin by installing a discovery agent on or near an existing identity infrastructure element, such as an Apache server. As used herein, a discovery agent may refer to an autonomous or semi-autonomous software entity that is configured to assess identity information within an identity infrastructure. Identity information may comprise identity data, identity metadata, structure and/or contents of identity sessions, as well as configuration and deployment information for software and hardware entities of an identity domain. In some cases, the discovery agents may intercept and/or proxy networking traffic (e.g., an identity data flow 415) as it is relayed to any of the identity infrastructure elements, such as runtime systems (e.g., authenticate system 421, access system 423, attributes system 426, risk system 424, device system 422) for authentication (e.g., multi-factor authentication (MFA)), authorization, gathering identity attributes, etc.

In this example, a user is attempting to access resource 425. As shown, the process flow 400 may begin by a login 401 from the user. Login 401 may comprise receiving identity data, including one or more of a username, a password, a fingerprint, iris scan, voice input, unique identifier, unique pin, etc. Following login, the user input may be relayed to any one of the runtime systems as an identity data flow 415. In some cases, a discovery agent may intercept the networking traffic (i.e., within the identity data flow 415) and identify the login as identity data.

In this example, the identity data flow 415 may be sent to one or more identity infrastructure elements, such as an authenticate system 421, an access system 423, an attributes system 426, a device system 422, and/or a risk system 424 associated with an identity domain. In some cases, the identity flow 415 may be sent to other systems not identified herein. In some cases, the authenticate system 421 may support multi-factor authentication 429, the access system 423 may support identity as a service (IDaaS) 431 for authorization, and the attributes system 426 may be linked or associated with a Lightweight Directory Access Protocol (LDAP) 433 for gathering identity attributes. Specifically, access system 423 may enforce decisions about authentication and authorization set by the identity as a service (IDaaS) system 431.

In some embodiments, the discovery agent may detect and assess the state and structure of an identity infrastructure by analyzing the network traffic or identity data flow 415 as it passes en route to the protected resource 425. For instance, the discovery agent may detect the configuration and behavior of the identity infrastructure elements, where the configuration may include identity data and identity metadata stored within the identity infrastructure elements. Behavior may comprise identity operations performed by the elements, examples of which are below. In some cases, assessing the identity infrastructure by the discovery agent may be based at least in part on detecting and assessing one or more identity-centric operations, as described herein with respect to the identity data, metadata, and identity infrastructure elements. In some examples, the one or more identity-centric operations and behavior may comprise at least one of enforcing authentication rules based on an authentication performed by the user (e.g., login 401 and authentication by authenticate system 421), granting or denying access to a protected resource (e.g., based on a request to access resource 425), and enforcing authorization rules (e.g., using access system 423).

In the example shown, the device system 422 may be linked or associated with a first custom API 427-a, which may be configured to perform device verification, and the risk system 424 may be linked or associated with a second custom API 427-b, which may be configured to retrieve a threat or risk score. In some embodiments, the APIs 427-a and/or 427-b may link the device system 422 and/or risk system 424, respectively, to one or more applications (not shown), where the one or more applications may be third-party applications. In some cases, the one or more third party applications may be executed or hosted on another server (not shown). For instance, the device system 422 may be configured to interact with a third-party device verification application by making a call (e.g., an API call) using API 427-a. The third-party device verification application may then process the information received from the device system 422 (e.g., via the API 427-a) and relay a response (e.g., Verified or Not verified, 1 or 0, Yes or No, etc.) to the device system 422, based on which the user device from which the login 401 was received may be verified. In some cases, the device system 422 may receive the response via the API 427-a. In some cases, the risk system 424 may also interact with a third-party risk verification application by making an API call using API 427-b, where the third-party risk verification application may then relay a response back to the risk system 424 via the API 427-b. In some embodiments, the third-party risk and verification applications may be executed or hosted on the same or a different third-party server. In some cases, device verification may serve as an added level of security (i.e., in addition to a username and password, for instance) and may be used to verify that the login 401 is coming from a recognized device (e.g., mobile device, laptop, computer, etc.) associated with an authorized user. In some cases, device verification may comprise transmitting a verification code over text (SMS), a phone call, an app, etc., to a recognized device associated with the user. The device system 422 may verify the device from which the login 401 was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 401 is during non-working hours (e.g., 3 AM) as compared to during working hours (e.g., 11 am). In another example, a lower risk score may be assigned when the login 401 is from a known IP address as opposed to an unknown IP address. In yet another example, a higher risk score may be assigned when the login 401 is from a geographic region (e.g., city, state, country, etc.) that the user has never logged in from before.

In some cases, the risk system 424 may be configured to authorize or flag the login 401 based in part on comparing the retrieved risk or threat score to a threshold. In one non-limiting example, the login 401 and access to resource (e.g., app 425) may be denied based on the risk score exceeding the threshold. In another example, the user requesting the login 401 may be prompted to change their password based on receiving a link or code on a registered device. In this case, the user may need to first click the link or input the code received on their registered device (e.g., a smartphone associated with the user) and then proceed to update their password. The user may then restart the login 401 process via the one or more runtime systems. Alternatively, if the risk or threat score is under a threshold, the login 401 may be successful and a session may be initiated 434 (e.g., the user device may display a Welcome Screen with one or more links to access different apps or resources, including app 425).

The discovery agent element may be configured to monitor the identity data flow as it passes through the various identity infrastructure elements or runtime systems and determine the information used to establish an identity session 434 and gain access to the protected resource 425 (i.e., a successful request). In some cases, the discovery agent element may also identify where unsuccessful requests are routed to (e.g., routed to attributes system 426 so that user password can be updated). In some cases, a session may refer to a temporary and interactive information interchange between two or more communicating devices (e.g., a user device associated with login 401 and a server hosting app 425). Further, an established session may be a prerequisite for performing a connection-oriented communication. In some cases, a session may be initiated or established before data is transferred. As described above, session initiation 434 may comprise displaying a successful login screen or welcome screen with one or more links to resources or apps authorized for use by the user, for instance, which may be indicative of a connection between the user device and the server hosting the app 425.

It should be noted that the identity data flow 415 may interact with any of the runtime systems illustrated in FIG. 4, and in any order. In some other cases, the identity data flow 415 may interact with different runtime systems in parallel (e.g., authenticate system 421 and device system 422 simultaneously). In other cases, the identity data flow 415 may interact with the runtime systems in a first branch (e.g., the left branch in FIG. 4), followed by the runtime systems in the second branch (i.e., right branch). Either way, the discovery agent elements may be configured to detect the behavior and configurations of the various identity infrastructure elements and report the same to a centralized server or administrator based on intercepting the identity data flow 415 within the identity infrastructure.

Figure 5:
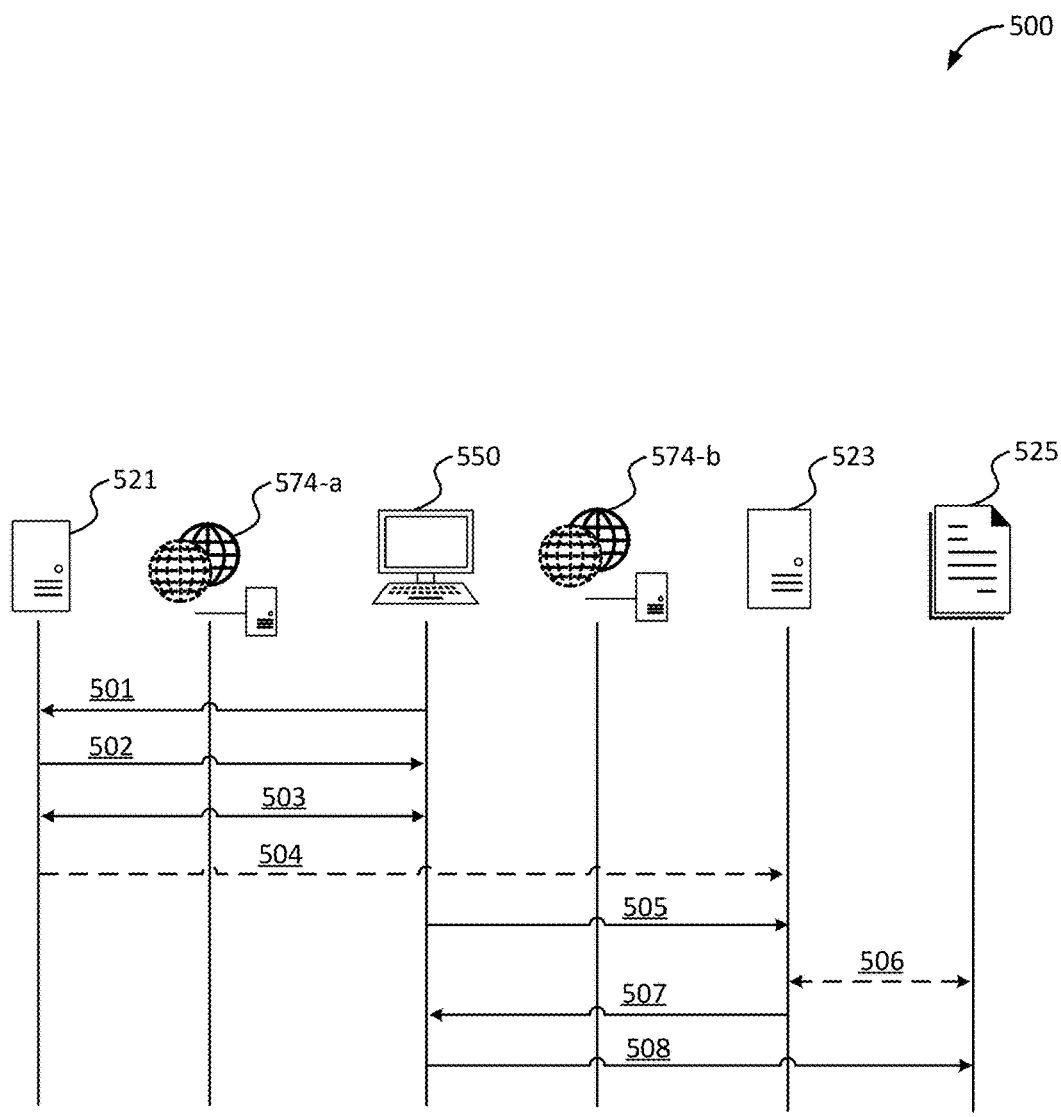
FIG. 5 illustrates a swim diagram for discovery and assessment of identity infrastructure, according to an embodiment of the disclosure.

FIG. 5 illustrates a swim diagram 500 for discovery and assessment of identity infrastructure, according to an embodiment of the disclosure. In some circumstances, a client organization utilizing an on-premise legacy based identity system may consider migrating to a cloud based identity system. One option may involve manual discovery of identity infrastructure, which is not only painstaking and costly, but also prone to errors. In some cases, manual migration projects may also involve rewriting applications so that they are compatible with cloud based identity systems. Aspects of the present disclosure relate to an identity discovery system that helps in the discovery and visualization of distributed identity infrastructure. In some cases, the system may create an inventory of software, services, identities, policies, and/or configurations in use by a client organization, which may facilitate the client organization in understanding how their apps integrate with their various identity systems (or identity domains), including any dependencies between the two. Swim diagram 500 may be implemented using one or more identity infrastructure elements, such as an authenticate system 521, an authorization system 523 (also referred to as an access system), a protected resource 525, one or more discovery agents 574 (e.g., discovery agent 574-*a*, discovery agent 574-*b*), and a user device 550. The discovery agents 574 may be similar or substantially similar to the discovery agent 374 previously described in relation to FIG. 3B.

In some cases, the authorization system 523 (also shown as access system 423 in FIG. 5) may be configured to enforce authorization rules and/or evaluate authorization rules based at least in part on identity session attributes. For instance, the authorization system 523 may comprise at least one of a policy enforcement point for enforcing authorization rules and a policy decision point for evaluating authorization rules based at least in part on identity session attributes. The protected resources 525 may comprise applications or apps, or any other type of protected resource (e.g., files, documents, databases, etc.) to which access is restricted based on identity data.

In the example shown, discovery agent elements 574-*a* and 574-*b* have been deployed onto the client organization's network (i.e., within their identity infrastructure). In some cases, the discovery agent elements 574-*a* and/or 574-*b* may be configured to read configuration data from web servers, proxies, application servers, identity systems or identity domains, directories, and/or databases in the identity infrastructure. Additionally or alternatively, the discovery agent elements 574 may be configured to read policies and session information from identity system datastores. In some cases, the discovery agent elements 574 may be utilized to gather real-time data about how user access to applications or protected resources 525 is routed within the identity infrastructure. In some cases, a client organization may utilize an access management platform, for instance, a SiteMinder Webagent installed on a server, such as an Apache server. In some other cases, the access management platform may comprise an Oracle Access Manager (OAM) server. Further, the discovery agent 574 may be installed on or near the Apache server, for instance (e.g., FIG. 3B illustrates the discovery agent 374 installed on or near the identity infrastructure element 316-*i*). In some circumstances, the server may also store information for one or more of: policies, configurations, roles, identities, groups, and features, for the identity domain, to name a few non-limiting examples. In some cases, the discovery agents 574 may be configured to detect and assess the network and/or identity traffic as it is routed to the protected resource 525, for instance, to identify the type of information a successful request contains, to identify how and where unsuccessful requests are routed, etc. A successful request may refer to a request where a user gains access to the protected resource. Contrastingly, an unsuccessful request may refer to a request where the user is denied access to the protected resource. Further, as noted above, an identity session refers to an established set of identity data that represents a user interacting with the identity infrastructure. In some cases, a session may be established by authenticating a user (e.g., by a user proving their identity through a mechanism such as password or biometrics) and maintaining this session state (e.g., authenticated state) for some established period of time or until the user logs out or their access rights are otherwise suspended.

In some cases, a user wishing to access an application (e.g., protected resource 525) via user device 550 may first need to authenticate themselves (i.e., properly identify themselves). As shown, at step 501, the user device 550 may send user authentication data (e.g., user identity, user credential, user attribute information) to authenticate system 521. Some non-limiting examples of the user authentication data include a username, a password, and biometric information.

At step 502, the authenticate system 521 may authenticate the user based on the user authentication data and send a confirmation message (e.g., a token) and/or information pertaining to an identity session to the user device 550.

At step 503, an identity session may be established between the user associated with the user device 550 and an identity domain. It should be noted that the identity session and the protected resource 525 may be associated with the identity domain. In some examples, the discovery agent 574-*a* may assess the identity infrastructure based at least in part on intercepting and/or monitoring the communications (e.g., network traffic in steps 501-503) between the user device 550 and the authenticate system. In some cases, the assessing may include one or more of detecting and reporting of identity data and identity metadata from within the identity infrastructure, where the identity data may include one or more of a user identity, a user credential, and a user attribute for one or more individual users of the identity domain. Further, the identity metadata may include one or more of a password rule, an authorization policy, an authentication policy, a trust policy, and network locations for identity domain elements of the identity domain.

At step 504 (shown as optional by the dashed lines), the authenticate system 521 may transmit an authentication assertion message to authorization system 523, where the authentication assertion message may indicate that the user has been authenticated. In some cases, the authenticate system 521 may also transmit the token transmitted to the user device 550, which may enable the authorization system 523 to match the token(s) received from the user device 550 and the authenticate system 521. In some examples, one or more of the discovery agents 574-*a* and 574-*b* may monitor or intercept the network traffic (e.g., in step 504) flowing through the identity infrastructure. Further, the discovery agent(s) 574 may determine the type of information in an authentication assertion message and/or a token, for instance, and report back details on the same to one or more of an administrator and a centralized server (e.g., shown as system 300-*a* in FIG. 3A).

At step 505, the user device 550 may relay the token and/or identity session information received from the authenticate system 521 to the authorization system 523. In some examples, the user device 550 may also transmit a request to access the protected resource 525.

At step 506, the authorization system 523 may perform authorization assertion with the protected resource 525. Authorization assertion may comprise evaluating and enforcing the access rules for the user (e.g., is user authorized to access this particular resource). In some cases, the identity session may be accepted by the protected resource 525 based at least in part on evaluating the identity session and the identity data.

At step 507, the authorization system 523 (or alternatively, the protected resource 525) may transmit a message indicating that the user has been granted access to the protected resource 525. The discovery agent 574-b may monitor the contents of this message, for instance, and transmit a report on the same to a centralized server, such as system 300-a in FIG. 3A.

At step 508, the user associated with the user device 550 may access the protected resource 525.

Figure 6:
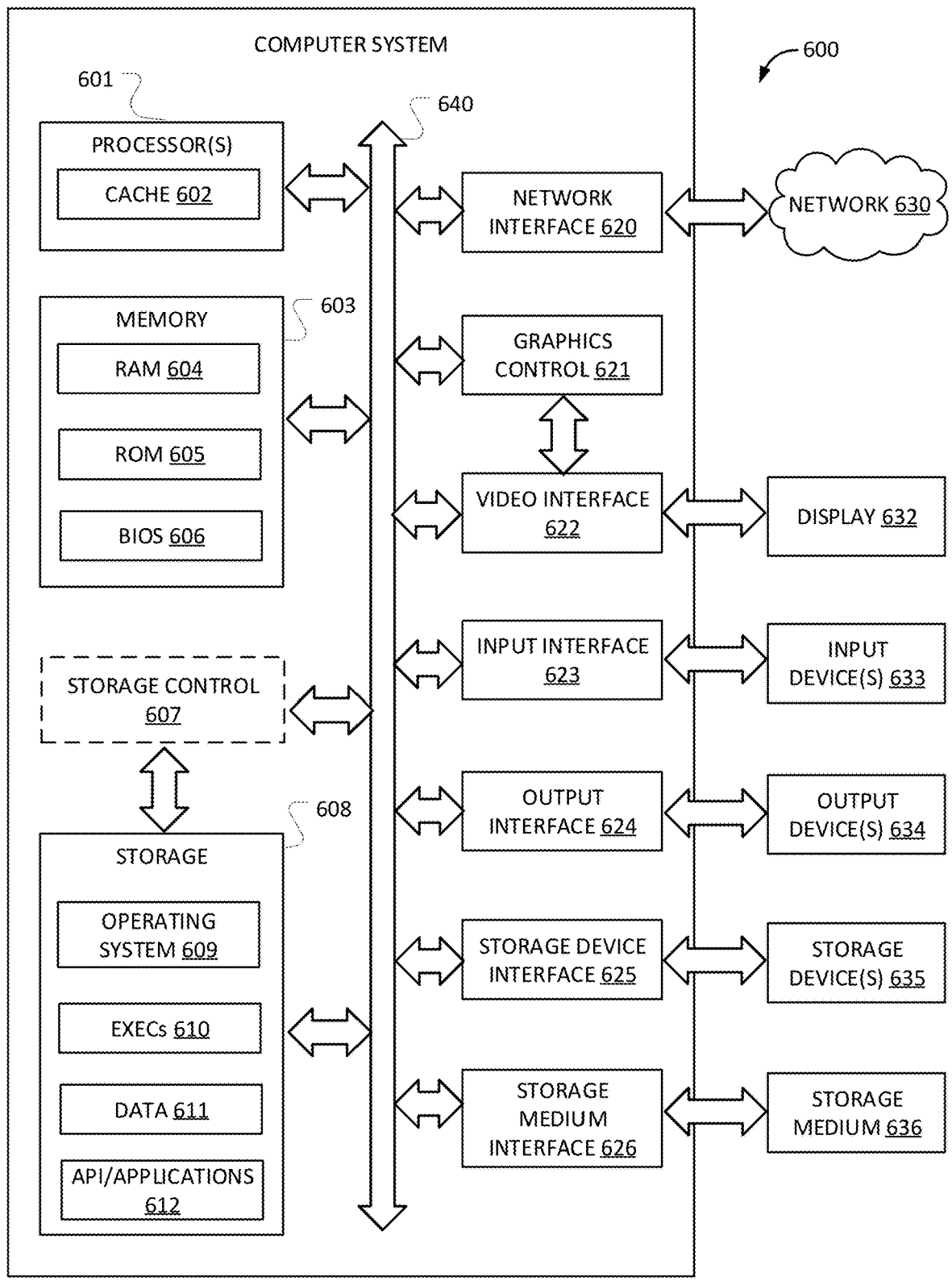
FIG. 6 illustrates a block diagram of a computing system, according to an embodiment of the disclosure.

FIG. 6 illustrates a diagrammatic representation of one embodiment of a computer system 600, within which a set of instructions can execute for causing a device to perform or execute any one or more of the aspects and/or methodologies of the present disclosure. The components in FIG. 6 are examples only and do not limit the scope of use or functionality of any hardware, software, firmware, embedded logic component, or a combination of two or more such components implementing particular embodiments of this disclosure. Some or all of the illustrated components can be part of the computer system 600. For instance, the computer system 600 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 600 includes at least a processor 601 such as a central processing unit (CPU) or a graphics processing unit (GPU) to name two non-limiting examples. Any of the subsystems described throughout this disclosure could embody the processor 601. The computer system 600 may also comprise a memory 603 and a storage 608, both communicating with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various non-transitory, tangible computer-readable storage media 636 with each other and/or with one or more of the processor 601, the memory 603, and the storage 608. All of these elements may interface directly or via one or more interfaces or adaptors to the bus 640. For instance, the various non-transitory, tangible computer-readable storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 632 for temporary local storage of instructions, data, or computer addresses. Processor(s) 601 are configured to assist in execution of computer-readable instructions stored on at least one non-transitory, tangible computer-readable storage medium. Computer system 600 may provide functionality as a result of the processor(s) 601 executing software embodied in one or more non-transitory, tangible computer-readable storage media, such as memory 603, storage 608, storage devices 635, and/or storage medium 636 (e.g., read only memory (ROM)). Memory 603 may read the software from one or more other non-transitory, tangible computer-readable storage media (such as mass storage device(s) 635, 636) or from one or more other sources through a suitable interface, such as network interface 620. Any of the subsystems herein disclosed could include a network interface such as the network interface 620. The software may cause processor(s) 601 to carry out one or more processes or one or more steps of one or more processes described or illustrated herein. Carrying out such processes or steps may include defining data structures stored in memory 603 and modifying the data structures as directed by the software. In some embodiments, an FPGA can store instructions for carrying out functionality as described in this disclosure. In other embodiments, firmware includes instructions for carrying out functionality as described in this disclosure.

The memory 603 may include various components (e.g., non-transitory, tangible computer-readable storage media) including, but not limited to, a random-access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable non-transitory, tangible computer-readable storage media. In some instances, ROM 605 and RAM 604 include non-transitory, tangible computer-readable storage media for carrying out a method. In one example, a basic input/output system 606 (BIOS), including basic routines that help to transfer information between elements within computer system 600, such as during start-up, may be stored in the memory 603.

Fixed storage 608 is connected bi-directionally to processor(s) 601, optionally through storage control unit 605. Fixed storage 608 provides additional data storage capacity and may also include any suitable non-transitory, tangible computer-readable media described herein. Storage 608 may be used to store operating system 605, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, such as mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicate to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621. In addition to a display 632, computer system 600 may include one or more other peripheral output devices 634 including, but not limited to, an audio speaker, a printer, a check or receipt printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition, or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 600 shown in FIG. 6 such as, but not limited to, the network 630, processor 601, memory 603, etc., may comprise a cloud computing system. In one such system, front-end systems such as input devices 633 may provide information to back-end platforms such as servers (e.g., computer systems 600) and storage (e.g., memory 603). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Alternate Embodiments

Given an existing identity infrastructure with one or more identity domains which have one or more protected resources. One proposed system introduces discovery agents that are installed on or adjacent to existing identity infrastructure elements to assess and report on a status and/or structure of the identity infrastructure. The discovery agents assess and report the existence of elements within the identity infrastructure. Such elements may include but are not limited to servers, routers, identity stores such as, but not limited to, databases of authentication information, policy enforcement points such as, but not limited to hardware with software running on it that is tasked with enforcing the authorization (not authentication) rules, authentication points such as, but not limited to, points determining user identity, not what they are allowed to do; for example, checking a username and a password, although additional levels of authentication through mechanisms like MFA are contemplated, proxies such as, but not limited to NGINX or an Apache web server with an Oracle or SiteMinder Webagent installed, and policy decision points. Decision points evaluate the rules given the attributes of the identity session. Enforcement points use the results of this evaluation to allow or deny access. In some cases, decisions may be slow (e.g., as compared to enforcement), since enforcement may be performed using cached values of previously made decisions.

Another proposed system introduces discovery agents that are installed in such a manner that they are able to intercept and/or proxy networking traffic that represents requests for identity data or identity metadata by other elements within the Identity Infrastructure, and uses the information therein to assess and report on the structure of the Identity Infrastructure.

The system may further introduce discovery agents that are installed in such a manner that they are able to intercept and/or proxy networking traffic that represents assertions of identity data or identity metadata that are evaluated by identity elements to allow or restrict access to protected resources by other elements within the identity infrastructure, and uses the information therein to assess and report on the structure of the identity infrastructure.

The discovery agents are able to detect and assess the configuration of the identity infrastructure elements. This includes identity data and identity metadata that may be stored within the elements, as well as configuration indicating identity data flow (one such example comprises a user that wants to access "protected resource alpha" and when the request arrives without a session, they are redirected to an Okta login page where they are prompted for credentials. After a session is established, they are returned to "protected resource alpha") and behavior of the identity infrastructure elements individually and as a whole.

The discovery agents are further able to detect and assess the protected resources within the identity infrastructure. This includes but is not limited to detection via processing the configuration of the elements within the identity infrastructure, by processing and assessing network and identity traffic as it passes through the identity infrastructure (by, for example, watching the traffic as it passes en route to the protected resource and seeing what successful requests contain, and where unsuccessful requests are routed to), and by processing identity session information.

Discovery agents are able to autonomously assess additional points of interest within a networked identity infrastructure, from which additional information could be gleaned about the overall structure of the Identity Infrastructure. Points of interest may comprise a previously-unknown element of identity infrastructure, for example, if an agent were installed near to an Oracle Access Manager ("OAM") server and it were to determine in the OAM configuration that there was a proxy point (i.e., WebAgent) defined somewhere within the infrastructure. In such a situation it would then be beneficial to add a new discovery agent on or near that proxy point to glean more information.

Discovery agents are able to autonomously install new discovery agents at said points of interest within a networked identity infrastructure. Discovery agents are also or alternatively able to communicate to administrators to request the manual installation of discovery agents at said points of interest within a networked identity infrastructure.

Discovery agents are able to work in concert to assess and report on the overall Identity Infrastructure and not solely on the infrastructure to which they are adjacently installed. For example, one agent may request additional information from another remote agent about configuration or networking information visible to the remote agent. Agents may also inform each other of changes in configuration on a proactive basis so as to trigger a reassessment of the local environment. They may pass information between each other in chain formation—agent alpha may be able to communicate to agent beta, but agent charlie may not be reachable from agent alpha. Necessary information can be passed from charlie to beta, which is then communicated to alpha, allowing alpha to have a clearer picture of the overall state (and communicate that as described herein).

Discovery Agents report the assessed structure of the Identity Infrastructure to a centralized location in a human and machine-readable format to make the information actionable by administrators and/or other elements of the Identity Infrastructure.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for assessment of identity resources in an identity infrastructure, the system comprising:
    hardware processors configured by machine-readable instructions to:
    assess the identity infrastructure with a discovery agent element configured to assess authorized network traffic within the identity infrastructure, including monitored and unmonitored network traffic, wherein at least a portion of the identity infrastructure is known and a portion of the identity infrastructure is unknown, and wherein the known and unknown identity infrastructure comprises identity domains and identity infrastructure elements, wherein the discovery agent element is installed on or adjacent to the identity infrastructure elements, and wherein the identity domains comprise identity domain elements;
    identify, by the discovery agent element, one or more infrastructure elements within the identity infrastructure;
    intercept, by the discovery agent element, first authorized network traffic in the identity infrastructure, wherein the first authorized network traffic comprises requests for identity data or identity metadata from the one or more infrastructure elements within the identity infrastructure, wherein the identity data comprises a user identity, a user credential, or a user attribute for one or more users of the identity domains, and the identity metadata comprises a list of identity infrastructure elements, configuration, network location, identity policies, or identity session structure and content;
    assess, by the discovery agent element, a status or a structure of the identity infrastructure, wherein the assessing is based at least in part on the identifying, the intercepting, or a combination thereof;
    install, by a discovery agent element installment module, one or more new discovery agent elements based at least in part on assessing points of interest in said one or more infrastructure elements, wherein after the discovery agent element determines that additional information about the identity infrastructure may be gathered by installing the one or more new discovery agent elements, the discovery agent element installment module installs the one or more new discovery agent element at or near a proxy point; and
    report, by the discovery agent element, the status or the structure of the identity infrastructure to an administrator or a centralized server, the reporting being based at least in part on the assessing.

2. The system of claim 1, wherein,
    the one or more infrastructure elements installed in the identity infrastructure comprise servers, routers, or identity stores comprising databases of authentication information, policy enforcement points for enforcing authorization rules, authentication points for determining user identity, proxies, policy decision points for evaluating authorization rules based at least in part on identity session attributes, and protected resources;
    the identity policies comprise authorization rules and mechanisms, or authentication rules and mechanisms; and
    the identity data is utilized to access and control one or more protected resources.

3. The system of claim 1, wherein,
    the intercepting further comprises intercepting or proxying, by the discovery agent element, second authorized network traffic in the identity infrastructure; and
    the second authorized network traffic is associated with an assertion of identity data or identity metadata from the elements or agents in the identity infrastructure to a protected resource in the identity infrastructure.

4. The system of claim 1, wherein,
    the identity data or the identity metadata comprise data or metadata stored within the one or more infrastructure elements;
    the hardware processors are further configured by machine-readable instructions to detect and assess one or more configurations of the one or more infrastructure elements installed in the identity infrastructure based at least in part on the identifying; and
    the one or more configurations comprise at least one of,
    the data and metadata,
    information related to a flow of data associated with the one or more infrastructure elements, and
    behavior of the one or more of the infrastructure elements.

5. The system of claim 4, wherein,
    the identity infrastructure comprises the authorized network traffic and identity traffic passing through the identity infrastructure;
    the hardware processors are further configured by machine-readable instructions to detect and assess protected resources within the identity infrastructure based at least in part on processing the one or more configurations of the one or more infrastructure elements; and
    at least one of the authorized network traffic, identity traffic, and identity session information, wherein the identity session information comprises identity data for the one or more users.

6. The system of claim 1, wherein
    the discovery agent element and the new discovery agent elements comprise first, second and third discovery agents and wherein the hardware processors are further configured by machine-readable instructions to request, via a first discovery agent, identity infrastructure information received from a second discovery agent; and
    the request comprises a direct request to the second discovery agent or an indirect request via a third discovery agent.

7. A method for assessment of identity resources in an identity infrastructure, comprising:
- assessing the identity infrastructure with a discovery agent element configured to assess authorized network traffic within the identity infrastructure, including monitored and unmonitored network traffic, wherein at least a portion of the identity infrastructure is known and a portion of the identity infrastructure is unknown, and wherein the known and unknown identity infrastructure comprises identity domains and identity infrastructure elements, wherein the discovery agent element is installed on or adjacent to the identity infrastructure elements, and wherein the identity domains comprise identity domain elements;
- identifying, by the discovery agent element, one or more infrastructure elements within the identity infrastructure, said infrastructure elements including at least two of a network traffic interception module, a configuration detection module, a resource detection module, a point assessment module and a configuration information transmittal module;
- intercepting, by the discovery agent element, first authorized network traffic in the identity infrastructure, wherein the first authorized network traffic comprises requests for identity data or identity metadata from the one or more infrastructure elements within the identity infrastructure, wherein the identity data comprises a user identity, a user credential, or a user attribute for one or more users of the identity domains, and the identity metadata comprises a list of identity infrastructure elements, configuration, network location, identity policies, or identity session structure and content;
- assessing, by the discovery agent element, a status or a structure of the identity infrastructure, wherein the assessing is based at least in part on the identifying, the intercepting, or a combination thereof; and
- reporting, by the discovery agent element, the status or the structure of the identity infrastructure to an administrator or a centralized server, the reporting being based at least in part on the assessing.

8. The method of claim 7, wherein,
- the one or more infrastructure elements installed in the identity infrastructure comprise servers, routers, or identity stores comprising databases of authentication information, policy enforcement points for enforcing authorization rules, authentication points for determining user identity, proxies, policy decision points for evaluating authorization rules based at least in part on identity session attributes, and protected resources;
- the identity policies comprise authorization rules and mechanisms, or authentication rules and mechanisms; and
- the identity data is utilized to access and control one or more protected resources and restrict access and control of the protected resources.

9. The method of claim 7, wherein,
- the intercepting further comprises intercepting or proxying, by the discovery agent element, second authorized network traffic in the identity infrastructure; and
- wherein the second authorized network traffic is associated with an assertion of identity data or identity metadata from the elements or agents in the identity infrastructure to a protected resource in the identity infrastructure.

10. The method of claim 7, wherein the identity data and the identity metadata comprise data or metadata stored within the one or more infrastructure elements, the method further comprising:
- detecting and assessing one or more configurations of the one or more infrastructure elements installed in the identity infrastructure based at least in part on the identifying, wherein the one or more configurations comprise the data and metadata, information related to a flow of data associated with the one or more infrastructure elements, or behavior of the one or more of the infrastructure elements.

11. The method of claim 10, wherein the identity infrastructure comprises the authorized network traffic and identity traffic passing through the identity infrastructure; and wherein the method further comprises:
- detecting and assessing protected resources within the identity infrastructure based at least in part on processing the one or more configurations of the one or more infrastructure elements, and the authorized network traffic, identity traffic, or identity session information, wherein the identity session information comprises identity data for the one or more users.

12. The method of claim 7, further comprising:
- assessing additional points of interest within the identity infrastructure; and
- installing one or more new discovery agent elements within the identity infrastructure based at least in part on the assessing the additional points of interest, wherein the one or more new discovery agent elements are installed autonomously or upon transmitting an installation request to the administrator.

13. The method of claim 7, further comprising: requesting, by a first discovery agent, identity infrastructure information from a second discovery agent, wherein the requesting comprises a direct request to the second discovery agent or a request via a third discovery agent, and wherein the identity infrastructure information is accessible by the second discovery agent element.

14. A non-transient computer-readable storage medium having instructions embodied thereon, the instructions being executable by one or more processors to perform a method for assessment of identity resources in an identity infrastructure, the method comprising:
- assessing the identity infrastructure with a discovery agent element configured to assess authorized network traffic within the identity infrastructure, including monitored and unmonitored network traffic, wherein at least a portion of the identity infrastructure is known and a portion of the identity infrastructure is unknown, and wherein the known and unknown identity infrastructure comprises identity domains and identity infrastructure elements, wherein the discovery agent element is installed on or adjacent to the identity infrastructure elements, and wherein the one or identity domains comprise identity domain elements;
- identifying, by the discovery agent element, one or more infrastructure elements within the identity infrastructure;
- intercepting, by the discovery agent element, first authorized network traffic in the identity infrastructure, wherein the first authorized network traffic comprises requests for identity data or identity metadata from the one or more infrastructure elements within the identity infrastructure, wherein the identity data comprises of a user identity, a user credential, or a user attribute for one or more users of the identity domains, and the identity metadata comprises a list of identity infrastructure elements, a network location and a configuration of the identity infrastructure elements, identity policy, or an identity session structure and content;

assessing, by the discovery agent element, a status or a structure of the identity infrastructure, wherein the assessing is based at least in part on the identifying, the intercepting, or a combination thereof;

installing, by a discovery agent element installment module, one or more new discovery agent elements based at least in part on assessing points of interest in said identity infrastructure elements, wherein after the discovery agent element determines that additional information about the identity infrastructure elements may be gathered by installing the one or more new discovery agent elements, the discovery agent element installment module installs the one or more new discovery agent element at or near a proxy point; and reporting, by the discovery agent element, the status or the structure of the identity infrastructure to an administrator or a centralized server, the reporting being based at least in part on the assessing.

15. The computer-readable storage medium of claim 14, wherein, the one or more infrastructure elements installed in the identity infrastructure comprise servers, routers, identity stores comprising databases of authentication information, policy enforcement points for enforcing authorization rules, authentication points for determining user identity, proxies, policy decision points for evaluating authorization rules based at least in part on identity session attributes, or protected resources, wherein, one protected resource of the protected resources comprises an identity infrastructure element or an identity infrastructure application, and access and control of the protected resource is allowed or restricted based at least in part on identity data contained within the identity session structure and content; and the identity policy comprises authorization rules and mechanisms or authentication rules and mechanisms.

16. The computer-readable storage medium of claim 14, wherein the intercepting further comprises intercepting or proxying, by the discovery agent element, second network traffic in the identity infrastructure, wherein the second network traffic is associated with an assertion of identity data or identity metadata from the one or more elements or agents in the identity infrastructure to a protected resource in the identity infrastructure.

17. The computer-readable storage medium of claim 14, wherein the identity data or the identity metadata comprise data or metadata stored within the one or more infrastructure elements; and wherein the method further comprises:

detecting and assessing one or more configurations of the one or more infrastructure elements installed in the identity infrastructure based at least in part on the identifying, wherein the one or more configurations comprise the data and metadata, information related to a flow of data associated with the one or more infrastructure elements, or behavior of the one or more of the infrastructure elements.

18. The computer-readable storage medium of claim 7, wherein the identity infrastructure comprises the authorized network traffic and identity traffic passing through the identity infrastructure; and wherein the method further comprises:

detecting and assessing protected resources within the identity infrastructure based at least in part on processing the one or more configurations of the one or more infrastructure elements, and at least one of the network traffic, identity traffic, and identity session information, wherein the identity session information comprises identity data for the one or more users.

* * * * *